Dec. 27, 1932.  A. KEGRESSE  1,892,465

PROTECTING DEVICE FOR BALL BEARINGS

Filed Nov. 10, 1930

INVENTOR:
Adolphe Kégresse
BY
ATTORNEY

Patented Dec. 27, 1932

1,892,465

UNITED STATES PATENT OFFICE

ADOLPHE KEGRESSE, OF COURBEVOIE, FRANCE

PROTECTING DEVICE FOR BALL BEARINGS

Application filed November 10, 1930, Serial No. 494,717, and in France November 13, 1929.

It is well known that an efficacious protection of ball bearings against introduction therein of outer dust is very difficult to realize, and especially so when these ball bearings are bound to work quite near the ground, among marshes etc.

The object of the present invention is to provide a ball bearing protecting device.

Figure 1:
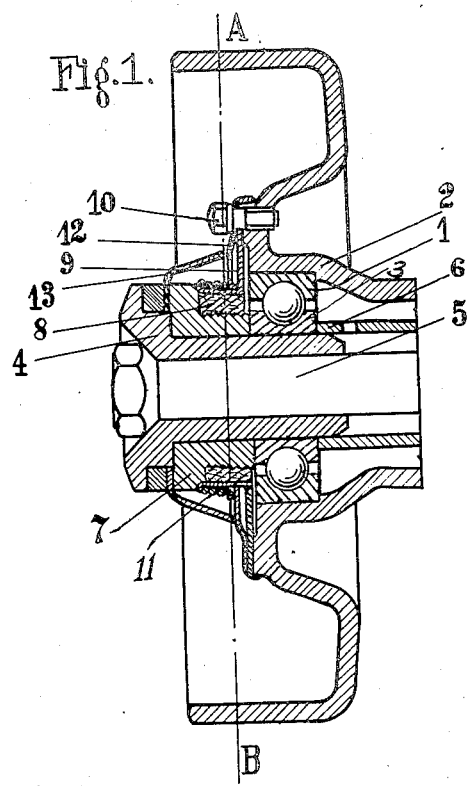
Figure 1 represents a view showing the embodiment of such a device.
Figure 2:
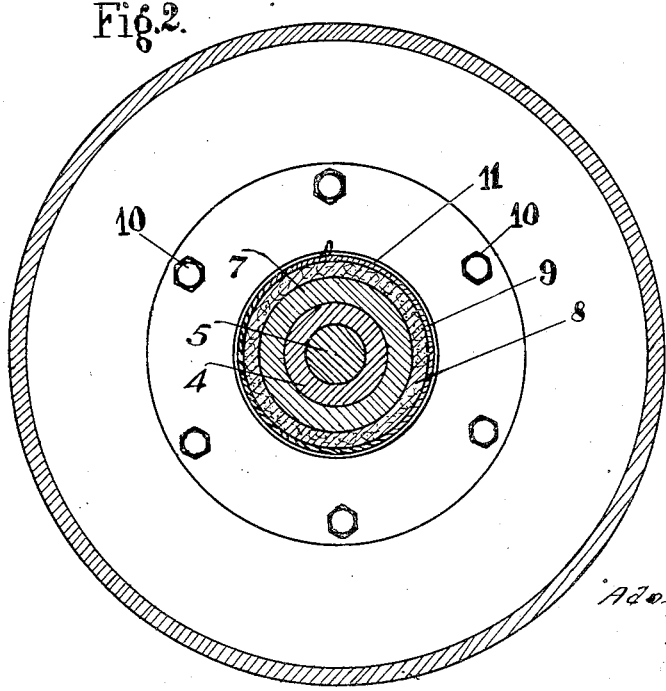
Figure 2 is a section along the line A—B in Figure 1.

The ball bearing is fitted as usual. Its outer casing or bearing element 1 (Figure 1) is mounted on the hub 2, supposed to be rotating; the inner ring or bearing element 3 is secured on a socket 4 (Figures 1 and 2) by means of axis 5, cross piece 6 and abutment 7.

This abutment carries a collar provided with circular and parallel striations on which is mounted a felt crown 8 or a crown made of some other material.

On this crown 8 is adjusted an embossed piece of leather 9 (Figures 1 and 2), which is otherwise fixed on the hub 2 by means of the screws 10. One or more spiral springs 11 force the embossed portion of the leather 9 to guarantee a perfect tightness of the leather piece 9 and crown 8, and ensures the driving of the latter by the first.

When the device is to be protected against hard objects from outside, an embossed piece of plate is used (12) which serves at the same time as a bearing washer for securing the piece of leather 9; and, on the other hand, a cupel-like plate piece 13, fixed on the fast axis of the arrangement. A slight play is provided between these two pieces.

It is seen that the tightness of the device is secured on one side by the crown 8 which, owing to its flexibility, applies firmly on the parallel circular striations of abutment 7 and on the other by the leather piece 9, as the two pieces 12 and 13 only ensure a rough protection against outer objects.

Besides its tightness, the arrangement, owing to the flexibility of the leather-piece 9, has the great advantage of affording a slight axial displacement of the axis in respect to the hub, without causing the internal oil to be drawn by capillarity, nor the external objects, as happens with the ordinary smooth friction protecting devices.

I claim:

1. Means for protecting a shaft bearing on which a hub rotates, comprising an outer bearing element attached to the hub, an inner bearing element attached to the shaft, an abutment ring engaging the inner bearing element, said abutment ring being provided with a grooved portion, a felt packing ring mounted on said grooved portion, and means attached to the hub for keeping foreign bodies out of the bearing elements comprising a layer of leather fastened to the hub and bearing against the felt packing ring and a coil spring forcing the leather against the felt packing ring.

2. Means for protecting a shaft bearing on which a hub rotates, comprising a flanged collar of flexible material, the flange of said collar being fixed to the hub, a sleeve fixed to the shaft, a ring of pliable material mounted on the sleeve, and means positioned on the face of the collar for securing the collar on the sleeve to prevent foreign bodies reaching the bearing.

3. The combination set forth in claim 2, wherein the sleeve is provided with grooves and the ring is of felt and mounted on the sleeve and has a portion extending into the grooves of the sleeve, the collar of the flange of flexible material being secured in engagement with the ring of felt.

4. The combination set forth in claim 1, including a plate curved to cover the means attached to the hub for keeping foreign bodies out of the bearing elements.

In testimony whereof I affix my signature.

ADOLPHE KEGRESSE.